July 8, 1969     D. L. MAXWELL     3,454,403
METHOD OF PREPARING A READY-TO-EAT PUFFED PRODUCT AND APPARATUS
Original Filed March 23, 1964
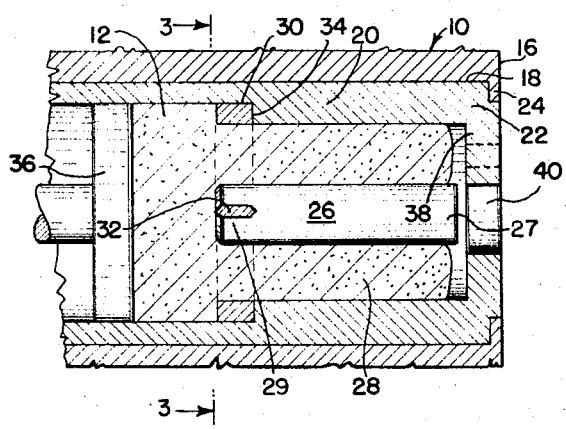
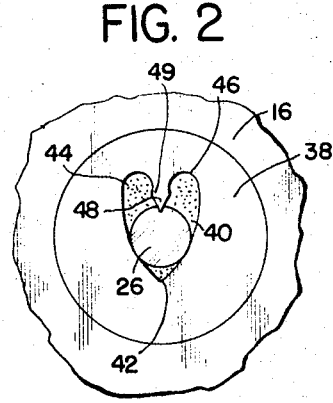
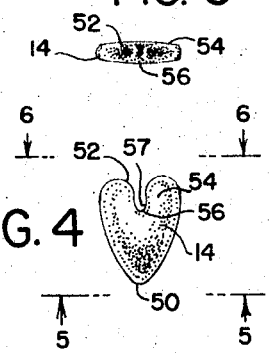
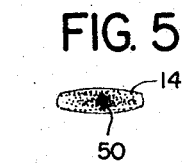
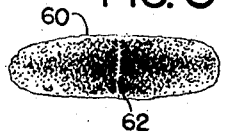
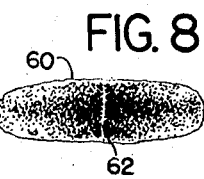
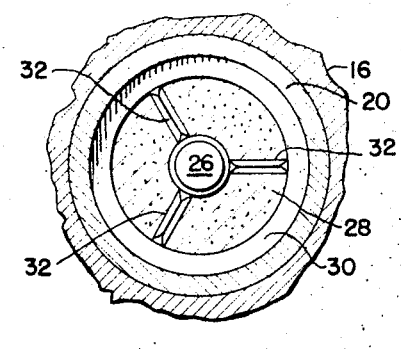
INVENTOR.
DONALD L. MAXWELL
BY
ATTORNEY

United States Patent Office 3,454,403
Patented July 8, 1969

3,454,403
METHOD OF PREPARING A READY-TO-EAT PUFFED PRODUCT AND APPARATUS
Donald L. Maxwell, Minneapolis, Minn., assignor to General Mills, Inc., a corporation of Delaware
Continuation of application Ser. No. 353,754, Mar. 23, 1964. This application July 14, 1967, Ser. No. 661,745
Int. Cl. A23l 1/18; A21c 11/16
U.S. Cl. 99—81                                      9 Claims

ABSTRACT OF THE DISCLOSURE

An apparatus and method for forming an extrudate having a heart-shaped cross-sectional shape. The extrudate is sliced into pellets, which are dried and puffed to form ready-to-eat food pieces. The pellets are shaped in such a manner that a heart-shaped configuration is retained after the puffing operation.

---

This application is a continuation of my prior application, Ser. No. 353,754, filed Mar. 23, 1964, now abandoned.

The present invention pertains to an extrusion apparatus for forming an extrusion, and more particularly to an extrusion die having a substantially heart-shaped die opening, an extrusion formed by the extrusion apparatus, and a process for making a puffed ready-to-eat food product.

In manufacturing cereal products, particularly those of the ready-to-eat variety such as breakfast foods, snacks, and the like, it has been found that if the cereal product possesses an easily recognizable shape or configuration, it often has an important bearing upon the commercial success of the product.

In the past, cereal products have been produced in a wide variety of shapes such as spheres, rings, pillow-shaped rectangles, letters of the alphabet, and the like. Numerous shaped cereals however, are difficult to produce, particularly when they are puffed, and they defy economical reproduction in the form of ready-to-eat products. One such cereal shape which is difficult to produce for example, is the shape of a heart.

The manufacture of a heart-shaped (also referred to hereinafter as cordate) puffed cereal has not been practical because of distortions caused during the puffing of the cereal pellets, as well as distortions caused by the flow of the gelatinized dough material during the extrusion process. An extrusion die opening shaped like the typical stylized heart pattern gives pellets which when puffed, yield nearly a spherical product. The use of a flow control pin in the center of the die opening is one way of reducing distortion caused during the extrusion process; however, according to the known state of the art, no way has been devised for maintaining a cereal pellet substantially heart-shaped after it has been puffed.

Accordingly, one object of the present invention is to provide an extrusion apparatus for producing a heart-shaped food product.

Another object is to provide an extrusion die apparatus for producing an extrusion having a cordate cross-section, which when subjected to a puffing process, will be substantially heart-shaped.

A further object is to provide a process for making a ready-to-eat heart-shaped food product.

A still further object is to produce a heart-shaped food product.

Still another object is to produce a substantially heart-shaped extrusion which will retain its heart shape after it has been expanded by a puffing process.

Other objects and advantages of the invention will become apparent from a consideration of the following specification and accompanying drawings. Before proceeding with a detailed description of the invention however, a short description of it will be presented.

Briefly, the extrusion apparatus includes a tubular casing mounted in a die block, one end of the casing being partially enclosed by a wall member having a substantially heart-shaped die opening therein. An elongate flow control pin is coaxially positioned within the casing, thereby forming an annular flow channel within the casing. The die opening is eccentrically positioned with respect to the flow control pin and the annular flow channel. An extrusion is formed by forcing a dough material through the die opening by appropriate means.

The invention will best be understood by reference to the following drawings, wherein:

FIGURE 1 is an elevational view in section illustrating an extrusion apparatus for producing a heart-shaped cereal product;

FIG. 2 is a partial end view of the apparatus shown in FIGURE 1;

FIG. 3 is a sectional view taken along line 3—3 of FIGURE 1;

FIG. 4 is a plan view of a cereal pellet before puffing;

FIG. 5 is an end view taken along line 5—5 of FIG. 4;

FIG. 6 is an end view taken along line 6—6 of FIG. 4;

FIG. 7 is a plan view showing a cereal pellet after puffing;

FIG. 8 is an end view taken along line 8—8 of FIG. 7; and

FIG. 9 is an end view taken along line 9—9 of FIG. 7.

FIGURE 1 illustrates an extrusion apparatus designated generally by reference numeral 10. A cereal dough 12 is shown being forced through the apparatus to form an extrusion or extrudate which will thereafter be sliced to form pellets 14, having a cross-sectional shape as shown in FIG. 4. The apparatus includes a die block 16 having a cylindrical passage 18 therein. A cylindrical tubular casing 20 is inserted within the passage 18 until one end 22 abuts against a flange 24 which forms a part of a die block 16. The casing is retained in the passage 18 by appropriate means, such as press-fitting it therein. An elongate flow control pin 26 is coaxially mounted within the casing 20 in such a manner that an annular flow channel 28 is formed between the casing and the flow control pin. One end 27 of the pin is positioned adjacent to the end 22 of the casing 20. The pin 26 is mounted within the casing 20 by attaching its other end 29 to a ring or band 30, by means of radially extending arms or spokes 32. The ring 30 is press-fitted within the casing 20 until it abuts against a shoulder 34 in the casing 20. A piston 36 is slidably mounted within the casing 20.

The end 22 of the casing 20 is provided with a wall member 38 which forms an integral part of the casing. A cordate-lanceolate opening 40 is provided in the wall member, for forming a desired shape of the extruded product. The term "cordate" is interchangeably used herein with the term "heart-shaped," and the term "cordate-lanceolate" generally means being gradually tapered toward the extremity, like the head of a lance. As viewed in FIG. 2, the shape of the die opening 40 is somewhat different from the typical heart configuration. It has been found that in order to achieve a pellet which will retain a heart shape when expanded by puffing, it is necesary to first produce a pellet having a somewhat non-conventional heart-shaped configuration prior to puffing. Thus, the opening outline is cordate-lanceolate having an acute point 42 and a pair of lobes 44 and 46 which are joined together to form a second point 48. The second point 48 is oppositely positioned with respect to the acute point 42, it includes a widened portion 49, and it projects at least one-third of the distance toward the acute point. As noted in FIGURES 1 and 2, the opening 40 is eccentrically positioned with respect to the flow control pin 26 and the annular channel 28. By eccentrically positioning the opening in this manner, the pin 26 aids in controlling the rate of flow of the dough through the opening 40. While the end 27 of the pin 26 is depicted and described as extending adjacent to the end 38, it is envisioned that in some circumstances, it might project into the opening 40, or it might terminate some distance away from the opening depending upon the type of dough being extruded, and the like.

In operation, the cereal dough is forced through the extrusion apparatus 10, and more particularly the annular passage 28 and the die opening 40 by the piston 36 which is caused to move toward the right as viewed in FIGURE 1, by appropriate means (not shown in the drawings). It must be understood of course, that the piston 36 is merely illustrative of one type of device which might be used for forcing the cereal dough through the extrusion apparatus, and it is envisioned that other types of devices could readily be used for this purpose as well. As the dough is forced to the right as viewed in FIGURE 1, it is extruded through the die opening 40 and it emerges in the form of a strand having a cross-sectional shape similar to that shown in FIG. 4.

As the strand leaves the extrusion apparatus 10, it is preferably immediately cut into thin slices at the die opening by appropriate slicing means (not shown in the drawings) to form pellets 14. If desired of course, an elongate extruded strand might first be formed, and the strand subsequently sliced to form pellets. FIGS. 4–6 illustrate the pellets 14 in detail. Note that the shape of the pellet 14 is substantially the same as the shape of the cordate opening 40 in the extrusion apparatus 10. The pellet has an acute point 50 and a pair of protrusions 52 and 54. The protrusions 52 and 54 lie in the same plane, and are joined together to form a depression 56. The depression 56 is oppositely positioned with respect to the acute point 50, it includes a somewhat widened portion 57 which corresponds to the widened portion 49 of the point 48, and it projects about one-third of the distance to the point 50.

After cutting the strand into slices to form pellets 14, the pellets are dried and thereafter puffed by subjecting them to sufficient radiant heat, fat frying, gun puffing, vacuum puffing, or the like. When subjected to a puffing process, the pellet 14 expands and the protrusions 52 and 54 spread apart from each other, as a result, the depression 56 moves away from the point 50 and becomes less pronounced. Moreover, the acute point 50 expands and becomes somewhat blunter. FIGS. 7–9 illustrate a puffed ready-to-eat cereal product 60. Note that the product 60 has a conventional heart-shaped outline with an obtuse point 62, and a pair of lobes 64 and 66 which are joined together to form an indentation 68. The indentation 68 is positioned on the opposite side of the puffed cereal product, and it projects toward the obtuse point. The obtuse point 62, the lobes 64 and 66 and the indentation 68 of the product 60 correspond to the acute point 50, the protrusions 52 and 54 and the depression 56 of the pellet 14 respectively.

The flow control pin 26 serves a two-fold purpose. First, it reduces distortion in the extrusion process by controlling the flow of the dough through the die opening 40; and second, it aids in compensating for distortion caused during the puffing process. More specifically, the shape of the die opening 40, as well as its eccentric position with respect to the pin 26 and the flow channel 28, compensates for distortions in the puffing process. As stated hereinbefore, the use of a die opening having a shape similar to that depicted by the puffed product 50, would result in a pellet which when puffed, would lack the desired heart-shaped outline. It has been found however, that a die opening which produces an extrusion having a shape similar to that illustrated in FIG. 4, results in a puffed cereal product having the desired heart-shaped outline.

The invention is applicable to cereal doughs which are cooked to a desired degree of gelatinization, i.e. at least partially gelatinized, including in general, doughs derived from wheat, corn, oats, rye, and the like; moreover, the doughs may be derived from a single grain or from a mixture thereof. These doughs may be cooked to the desired degree of gelatinization in any conventional manner. Collatz Patent No. 2,162,376 for example, illustrates a convenient way in which cooking of the dough might be carried out.

In the above description and attached drawings, a disclosure of the principles of this invention is presented, together with some of the embodiments by which the invention may be carried out.

Now, therefore, I claim:

1. A process of preparing a ready-to-eat food product comprising the steps of extruding an at least partially gelantinized dough material into a cordate strand, cutting said strand into thin slices, the outline of said slices havin an acute point and a pair of protruding lobes which are joined together to form a depression, said depression being oppositely positioned with respect to said acute point and projecting toward said point, drying said slices, and puffing said slices to form a heart-shaped food product having an obtuse point and a pair of lobes which are joined together to form an indentation projecting toward said obtuse point, said indentation being oppositely positioned with respect to said obtuse point, said obtuse point and said indentation of said food product corresponding to the acute point of the depression of the slice respectively.

2. The process of claim 1 wherein the depression formed in the sliced extrusion projects about one-third of the distance to the acute point.

3. An extrusion apparatus for forming an extrusion comprising a die block having a passage therein, means for forming a cordate extrusion including a wall member having a cordate opening therein, said wall member partially enclosing one end of said passage, means for forcing material to be extruded through the passage and the cordate opening, and means for reducing distortion of the extrusion during the extrusion process, said means including a flow control pin and said cordate opening, said pin being axially positioned within said passage thereby forming an annular flow channel within the extrusion apparatus, and said opening being eccentrically positioned with respect to said flow control pin and flow channel.

4. The combination of claim 3 wherein the cordate opening defines a pair of lobes and a point formed by the juncture of said lobes, said point including a widened portion between the lobes prior to the point of juncture.

5. An extrusion apparatus for forming an extruded product comprising a die block having a passage therethrough, said passage being cylindrical in cross section, a wall member partially enclosing one end of said passage, said wall member having a cordate discharge opening therein which communicates with said passage, a flow control pin extending axially within said passage, said pin being coaxial with said passage, the cordate discharge opening being eccentrically positioned with respect to the flow control pin, and means for forcing material to be extruded through the passage and through the cordate opening in the wall member thereby forming a heart-shaped extrusion.

6. An extrusion apparatus for forming an extruded product comprising a tubular casing having a substantially heart-shaped die opening in one end, an elongate flow control pin, means mounting said pin within said casing so that it is coaxial with said casing and one of its ends is adjacent to the die opening, said casing and said pin defining an annular flow channel within said die apparatus through which material to be extruded can flow, said die opening being eccentrically positioned with respect to the flow control pin and the flow channel, and means for forcing material to be extruded through the casing and the die opening.

7. The combination of claim 6 wherein the die opening outline in the end of the tubular casing is cordate-lanceolate having an acute point and a pair of protruding lobes which are joined together to form a second point, said second point being oppositely positioned with respect to said acute point and projecting at least one-third of the distance toward the acute point.

8. The combination of claim 7 wherein said second point includes a widened portion between said lobes proximate said point.

9. In a process of preparing a heart-shaped ready-to-eat product which includes extruding a dough material which is at least partially gelatinized into an extrudate, cutting said extrudate into thin slices, drying said slices, and puffing said slices to form a heart-shaped ready-to-eat food product, the improvement which comprises extruding said dough material into an extrudate having a cordate-lanceolate cross section defined by an acute point and a pair of protruding lobes which are joined together to form a depression which is substantially oppositely positioned relative to the acute point and which projects at least one-third of the distance toward said acute point, said depression including a widened portion proximate its tip.

References Cited

UNITED STATES PATENTS

| 2,162,376 | 6/1939 | Collatz | 99—82 |
| 2,190,949 | 2/1940 | Plews | 99—82 |
| 3,077,406 | 2/1963 | Benson | 99—81 |
| 3,246,990 | 4/1966 | Thompson et al. | 99—82 |

FOREIGN PATENTS 354,140  12/1920  Germany.

RAYMOND N. JONES, *Primary Examiner.*

U.S. Cl. X.R.

99—82; 107—14